United States Patent [19]
Tanaka et al.

[11] Patent Number: 4,467,246
[45] Date of Patent: Aug. 21, 1984

[54] LIGHT QUANTITY CONTROLLER AND INPUT DEVICE

[75] Inventors: Kano Tanaka; Hiroaki Takeda, both of Yokohama, Japan

[73] Assignee: Canon Kabushiki Kaisha, Tokyo, Japan

[21] Appl. No.: 294,572

[22] Filed: Aug. 20, 1981

[30] Foreign Application Priority Data

Aug. 28, 1980 [JP] Japan ............................ 55/118608
Sep. 1, 1980 [JP] Japan ............................ 55/121576
Sep. 1, 1980 [JP] Japan ............................ 55/121577
Oct. 22, 1980 [JP] Japan ............................ 55/148662

[51] Int. Cl.³ ............... H05B 41/29; H05B 41/392
[52] U.S. Cl. ................................. 315/158; 315/135; 315/136; 315/151; 315/224; 315/226; 315/DIG. 7
[58] Field of Search ............ 315/129, 135, 136, 151, 315/158, 224, 226, 291, 307, DIG. 7; 340/641; 323/353; 338/89, 118, 120

[56] References Cited

U.S. PATENT DOCUMENTS

| | | |
|---|---|---|
| 2,711,463 | 6/1955 | Goeppinger et al. ......... 338/89 X |
| 3,681,654 | 8/1972 | Quinn ............................ 315/151 |
| 3,947,117 | 3/1976 | Basu et al. ................... 315/151 X |
| 4,190,795 | 2/1980 | Schultheis ................... 315/158 X |
| 4,225,843 | 9/1980 | Nakamura et al. ............. 338/120 |

FOREIGN PATENT DOCUMENTS

0529988  1/1977  Japan .............................. 315/158

*Primary Examiner*—Eugene R. Laroche
*Attorney, Agent, or Firm*—Fitzpatrick, Cella, Harper & Scinto

[57] ABSTRACT

A light quantity controller and an input device are disclosed. The light quantity controller comprises a light source, a photo-sensor to detect a light quantity of the light source, a signal source for generating a reference signal, a comparator for comparing the detected light amount with the reference signal, and control circuit to control a duty ratio of the energization to the light source in accordance with the compare result to maintain the light quantity of the light source at a constant level. The light quantity controller further comprises a comparator to compare the energization signal to the light source with a reference signal to detect the degradation of the light source. The input device has a key matrix including a plurality of input ports and a plurality of output ports of a control unit interconnected through switches. A signal source independent from the output ports of the key matrix is connected to at least one of the input ports through switches.

18 Claims, 18 Drawing Figures

LIGHT QUANTITY CONTROLLER AND INPUT DEVICE

BACKGROUND OF THE INVENTION

1. Field of the Invention

The present invention relates to a light quantity controller for providing a stabilized light source and an input device for inputting a plurality of input signals to a controller.

2. Description of the Prior Art

In a copying machine, an image of a text is exposed by a light source in the machine to form a copy of the text.

A halogen lamp or a fluorescent lamp has been widely used as the light source, but the halogen lamp has defects in that it has a poor conversion efficiency, generates much heat which raises the temperature of the machine and adversely affects the components of the machine, and has a high power consumption. The fluorescent lamp has a defect in that a light quantity varies with a surrounding temperature (temperature of a tube wall of the fluorescent lamp). In the copying machine, the effect of the defects of the light source to the tone of the copy is substantial, as described above.

An approach to stabilize the light quantity of the light source has been proposed. In the proposed approach, the amount of energization of the light source is increased when the light quantity decreases so that the light quantity is increased to a desired level. The proposed approach also operates when the change in the light quantity is caused not by the phenomenon described above but by the degradation of the light source per se. Accordingly, if the degradation of the light source is such that the desired light quantity is not attained by increasing the amount of energization, power is wasted and the machine may be overheated by an excess current, which may lead to fire. As performance of a microcomputer is improved and the size thereof is reduced, various controls are carried out by the microcomputer. However, since the number of input/output ports of the microcomputer is limited, if a number of input signals are to be used as control information, a multiplexor or a key matrix circuit is usually used to process a large amount of control information with a small number of input ports.

Figure 1:
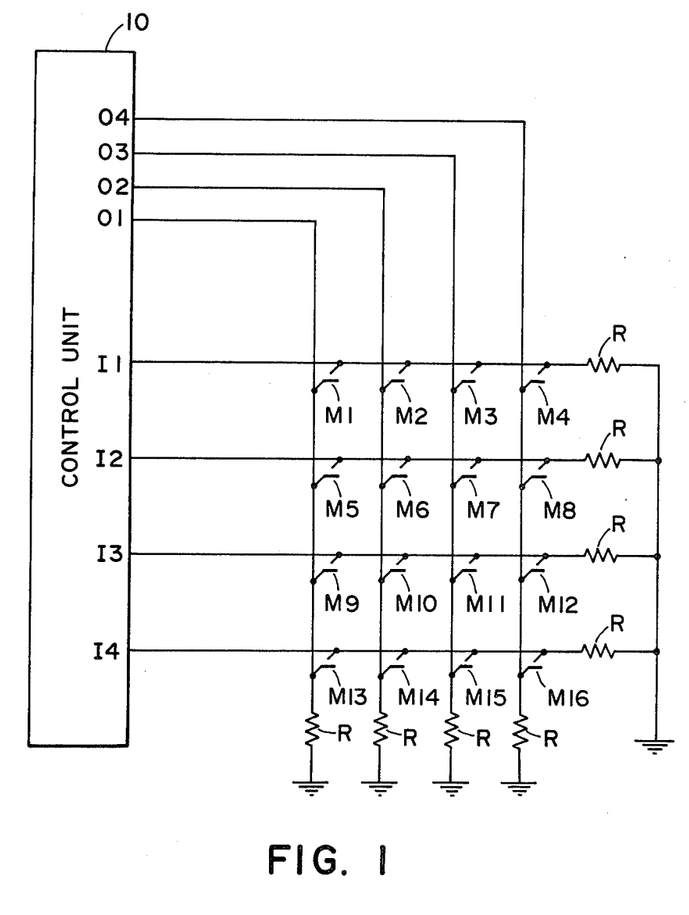
FIG. 1 shows a control circuit having an input device in accordance with a prior art key matrix circuit.

FIG. 1 shows a control circuit which uses an input device having a key matrix circuit. Numeral 10 denotes a control unit having a microcomputer, O1-O4 denote output ports, I1-I4 denote input ports, R denotes a resistor, and M1-M16 denote switches arranged between the input ports and the output ports which constitute the key matrix circuit. An operator actuates one of the switches M1-M16 to enter control information. The control unit 1 produces time-divided repetitive pulse HIGH signals at the output ports O1-O4, detects which one of the input ports I1-I4 a HIGH signal is applied to, determines the actuated switch and reads a status of the key into a memory. With such a key matrix circuit, a maximum number of switches that can be arranged is m×n where m is the number of output ports and n is the number of input ports. Thus, only m×n control information can be processed. When the multiplexor is used, the input and output ports can be saved but the cost increases.

SUMMARY OF THE INVENTION

It is an object of the present invention to provide a light quantity controller and an input device which are free from the above defects.

It is another object of the present invention to provide a light quantity controller which provides a stabilized light quantity from a light source.

It is a further object of the present invention to provide a light quantity controller which detects the degradation of a light source and indicates it to an operator.

It is a still further object of the present invention to provide an input device which utilizes a limited number of input/output ports of a control unit of a control circuit in an economic and effective way.

It is a still further object of the present invention to provide a light quantity controller suitable to obtain a desired light quantity from a light source.

DETAILED DESCRIPTION OF THE PREFERRED EMBODIMENTS

A light quantity controller for controlling a light quantity of an illumination lamp to a desired level is now explained.

Figure 2:
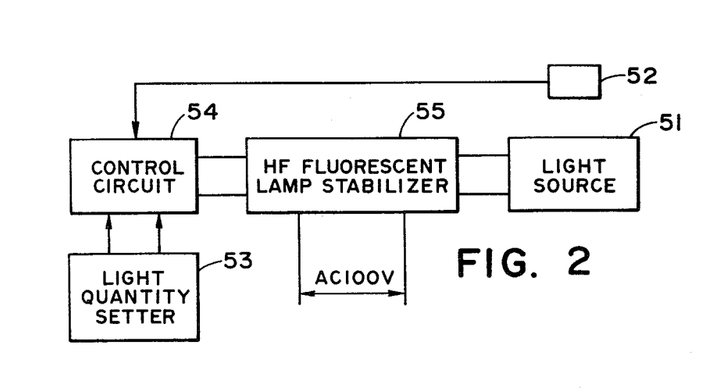
FIG. 2 shows a block diagram of a light quantity controller in accordance with the present invention.

FIG. 2 shows a block diagram of one embodiment of a light quantity controller of the present invention.

Numeral 51 denotes a fluorescent lamp light source, numeral 52 denotes a photo-sensor for detecting light quantity of the light source 52, numeral 53 denotes a light quantity setter having a potentiometer for setting a desired light quantity of the light source 51, numeral 54 denotes a control circuit for controlling the light quantity of the light source 51 by input signals from the photo-sensor 52 and the light quantity setter 53, and numeral 55 denotes a H.F. fluorescent lamp stabilizer which controls the energization of the fluorescent lamp of the light source 51 by a clock signal produced by the control circuit 54.

When a desired light quantity is set by the light quantity setter 53, the control circuit 54 provides the clock signal to the H.F. fluorescent lamp stabilizer 55 to attain the desired light quantity so that the H.F. fluorescent lamp stabilizer 55 causes the light source 51 to emit light in accordance with the clock signal. The photo-sensor 52 detects the light quantity of the light source 51 and supplies the detected signal to the control circuit 54. The control circuit 54 determines if the light source 51 emits the desired light quantity set by the light quantity setter 53, by the light amount detection signal from the sensor 52 which is indicative of the light quantity of the light source 51, and if the desired light quantity is not emitted, the clock signal to the H.F. fluorescent lamp stabilizer is corrected to attain the desired light quantity from the light source 51. Through the light quantity control described above, the desired light quantity set by the light quantity setter 53 can be attained from the light source 51.

Figure 3:
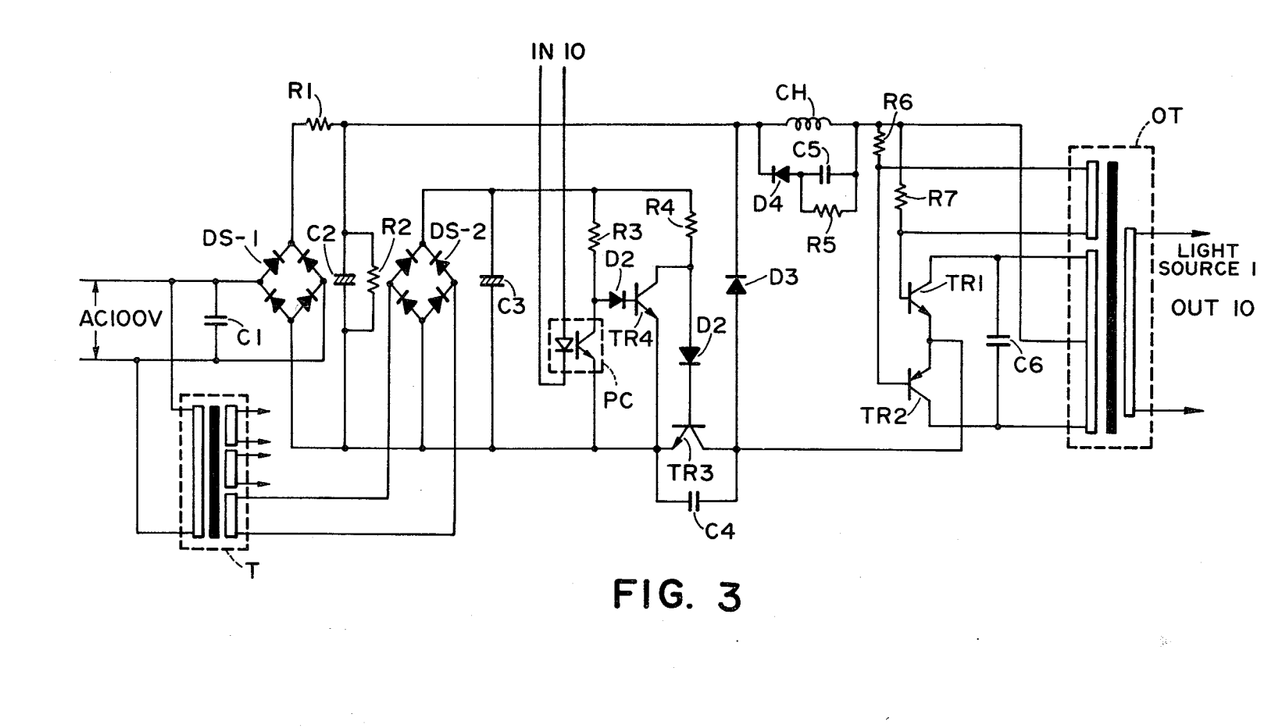
FIG. 3 shows a circuit diagram of a H.F. fluorescent lamp stabilizer.

FIG. 3 shows a detailed circuit diagram of the H.F. fluorescent lamp stabilizer 55 shown in FIG. 2.

Such a H.F. fluorescent lamp stabilizer 55 is commercially available and can be readily obtained. (For example, Tokyo Shibaura Electric Co., Ltd. 30TL-1004). R1–R4 denotes fixed resistors, C1–C7 denote capacitors, DS-1 and DS-2 denote diode rectifiers, D1–D4 denote diodes, CH denotes a choke coil, TR1–TR3 denote transistors, PC denotes a photo-coupler, T denotes a transformer, OT denotes an output transformer, IN10 denotes an input terminal to be connected to the control circuit 54, and OUT10 denotes an output terminal to be connected to the light source 51.

Figure 4:
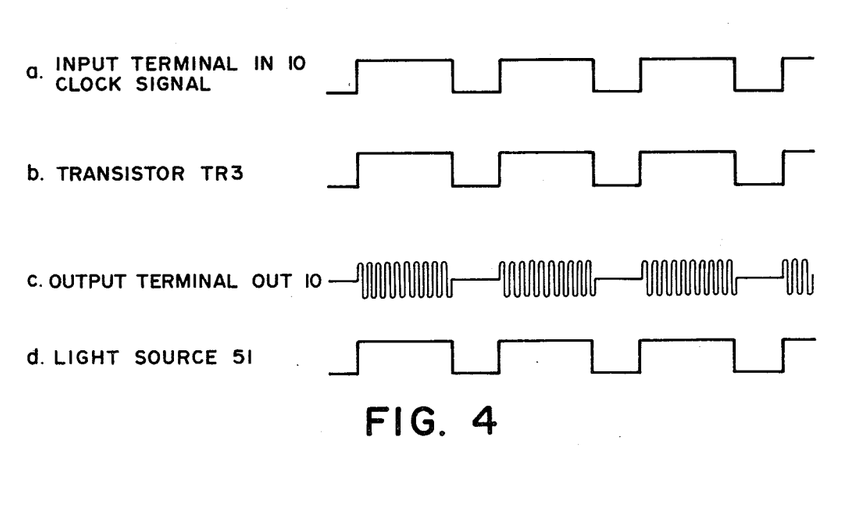
FIG. 4 shows an operation time chart of the circuit of FIG. 3.

FIG. 4 shows an operation timing chart of the circuit of FIG. 3. The operation is now explained with reference to the timing chart.

When the clock signal (of a frequency of approximately 1 KHz) is applied to the input terminal IN10 (FIG. 4a) from the control circuit 54 (FIG. 2), the photo-coupler PC turns on and off in synchronism with the turn-on and the turn-off of the clock signal. The turn-on and the turn-off of the photo-coupler PC determines the turn-on and the turn-off of the transistor TR4 and the turn-on and the turn-off of the transistor TR3. That is, the transistor TR3 turns on and off in synchronism with the turn-on and the turn-off of the clock signal to the input terminal IN10 (FIG. 4b). A push-pull circuit comprising the transistors TR1 and TR2 oscillates while the transistor TR3 is on. As it oscillates, a current flows to the output terminal OUT10 through the output transformer OT (FIG. 4c) so that the light source 51 connected to the output terminal OUT10 is energized to emit the light (FIG. 4d). When the light source 51 is the fluorescent lamp, a substantially uniform light quantity is attained due to an afterglow characteristic of phosphor material even when the on-off interval of the energization is approximately one millisecond.

In the time chart of FIG. 4, a ratio of the on time (t-on) of the clock signal from the control circuit 54 to the off time (t-off), that is, a duty ratio, is given by the following equation:

$$\text{duty ratio} = \frac{(t-\text{on})}{(t-\text{on}) + (t-\text{off})}$$

By changing the duty ratio, the energization time of the light source 51 (FIG. 2) can be controlled. That is, by changing the on time and the off time of the clock signal from the control circuit 54, the light quantity of the light source 51 can be controlled. (In an experiment, when the duty ratio was 10%, a tube current to the light source 1 was approximately 40 mA, and when the duty ratio was 90%, the tube current was approximately 800 mA).

Figure 5:
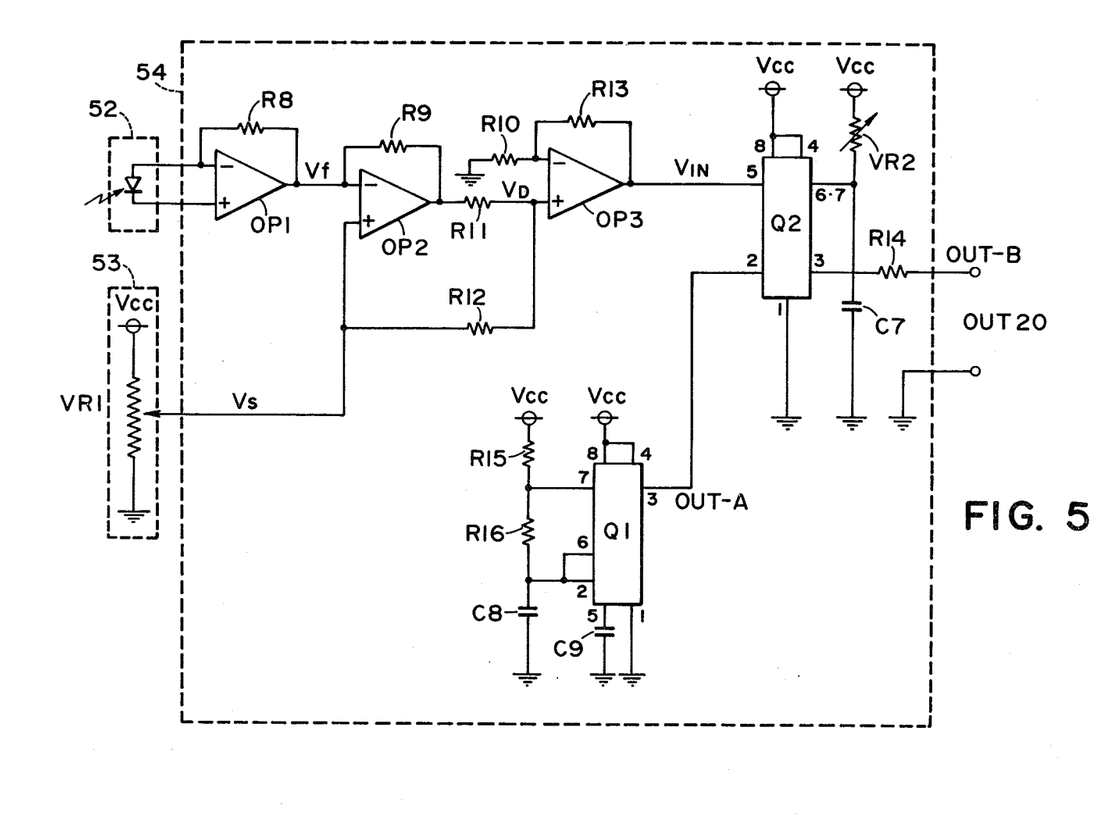
FIGS. 5 and 8 show circuit diagrams of control circuits.
Figure 6:
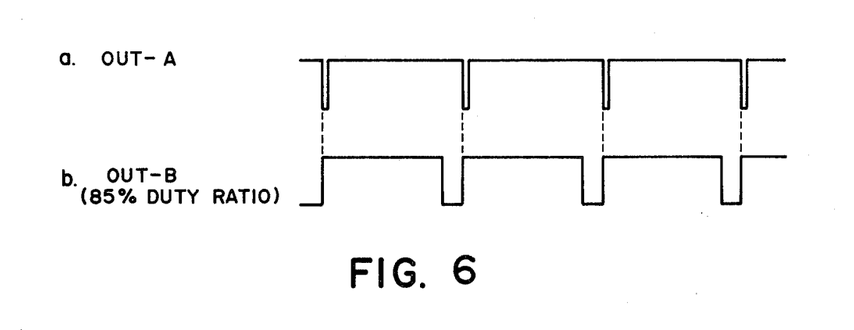
FIGS. 6, 7 and 9 show operation time charts of the control circuits.

FIG. 5 shows a detailed circuit diagram of the control circuit 54, the sensor 52 and the light quantity setter 53 of FIG. 2.

OP1–OP3 denote operational amplifiers, R8–R16 denote fixed resistors, C7–C9 denote capacitors, Q1–Q2 denote IC's, VR1 and VR2 denote potentiometers, Vcc denotes a positive voltage source and OUT20 denotes an output terminal to be connected to the H.F. fluorescent lamp stabilizer 55.

Figure 15:
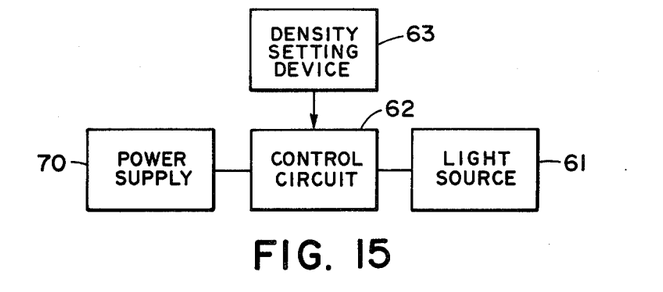
FIG. 15 shows a block diagram of a light quantity control circuit.

The IC Q1, the fixed resistors R15 and R16 and the capacitors C8 and C9 forms an oscillation circuit which produces an oscillation output OUT-A shown in FIG. 15a. The oscillation output OUT-A is supplied to a trigger terminal 2 of the IC Q2. The IC Q2 operates as a monostable multivibrator and a duty ratio of the output clock signal OUT-B thereof is determined by the potentiometer VR2, the capacitor C7 and a voltage $V_{IN}$ applied to a control terminal 5. The voltage $V_{IN}$ is explained below. A setting voltage VS from the light quantity setter 53 for setting the light quantity of the light source 51 is applied to a ⊕ terminal of the operational amplifier OP2 which is a differential amplifier and the operational amplifier OP3 which is a summing circuit. The output of the sensor 52 is applied to a ⊖ terminal of the operational amplifier OP2 through the operational amplifier OP1 which is an amplifier. (An output of the operational amplifier OP1 is Vf). Assuming that a gain of the differential amplifier is G (which is in the order of 100–200), the output voltage $V_D$ of the operational amplifier OP2 is given by $V_D = G(V_S - Vf)$. The output voltage $V_D$ is supplied to the operational amplifier OP3 together with the setting voltage $V_S$ from the light quantity setter 53 described above and the summing circuit of the operational amplifier OP3 produces the voltage $V_{IN}$. ($V_{IN} = V_S + V_D$ and hence $V_{IN} = V_S + G(V_S - Vf)$).

Figure 7:
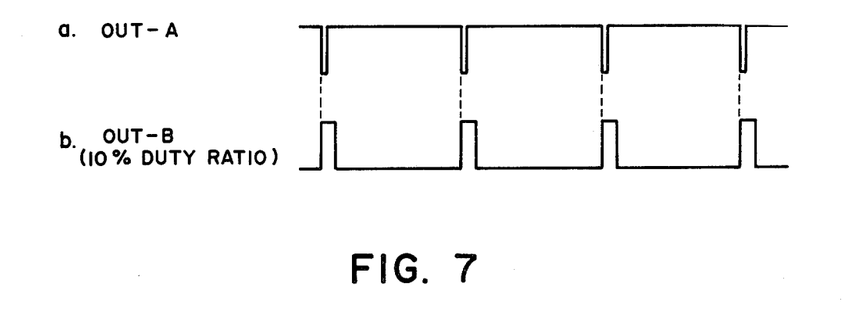

In an experiment, when $V_{IN}$ (volts) and the positive voltage Vcc (volts) applied to the IC Q2 have a relation of $V_{IN} = Vcc - 2$ and the capacitor C7 and the potentiometer VR2 are selected such that the clock signal OUT-B at the terminal OUT2 has a duty ratio of 85%, the clock signal OUT-B having a duty ratio of less than 10% as shown in FIG. 7b appears at the output terminal OUT2 when the voltage $V_{IN}$ is approximately one volt.

In this manner, by changing the output voltage $V_{IN}$ of the operational amplifier OP3 applied to the IC Q2, the duty ratio of the clock signal OUT-B at the output terminal OUT2 can be changed as desired.

Accordingly, by comparing the setting voltage $V_S$ of the light quantity setter 53 with the output voltage Vf of the operational amplifier OP1 which amplifies the output of the sensor 52 which detects the light quantity of the light source 51, and amplifying the difference by the operational amplifier OP2, the output voltage $V_D$ is produced. In the operational amplifier OP3, the output $V_D$ of the operational amplifier OP2 is added to the light quantity setting voltage $V_S$ to compensate for the difference between the set light quantity and the actual light quantity in order to correct the output voltage $V_{IN}$ applied to the IC Q2. Consequently, the output to the H.F. fluorescent lamp stabilizer 55 and hence the duty ratio of the clock signal OUT-B is corrected in the IC Q2 by the output voltage $V_{IN}$, and the duty ratio of the energization of the light source 51 is also corrected. As a result, the light source 51 can emit the preset light quantity.

By setting the gain G of the operational amplifier OP2 to be much greater than unity (G>>1), the control circuit 54 changes the output $V_{IN}$ to the IC Q2 such that the light quantity setting voltage $V_S$ and the output voltage Vf of the operational amplifier OP1 which amplifies the output of the sensor 52 are always equal. Thus, the light quantity controller which allows the light source 51 to emit the desired light quantity set by the light quantity setter 53 is provided.

When the present light quantity controller is used to control the light quantity of the light source for scanning a text of an image forming apparatus, the light amount set by the light amount setter can be constantly emitted. Consequently, the tone of the image formed is uniform and the image of any desired tone as set by an operator can be formed.

Figure 8:
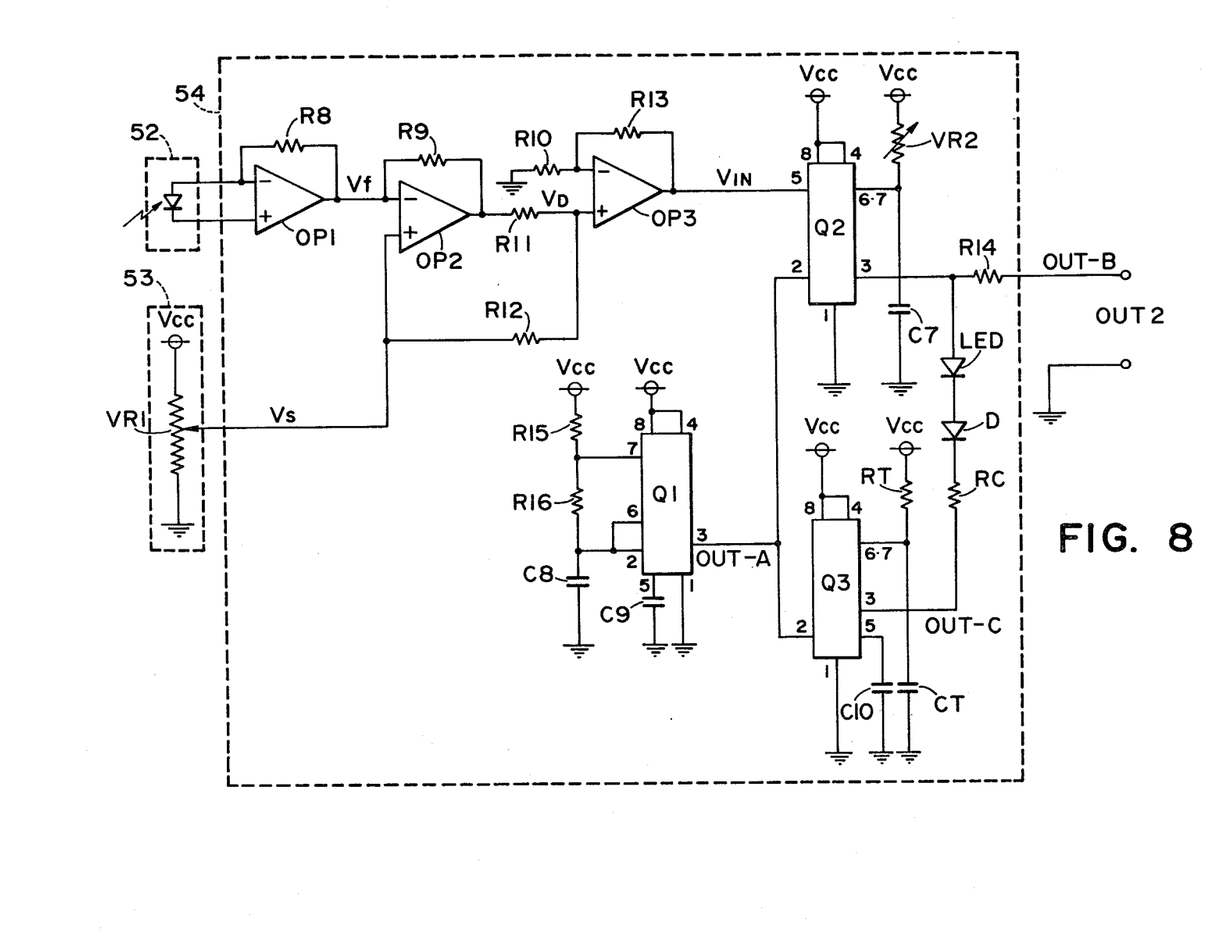

A control circuit shown in FIG. 8 includes an additional function of detecting the degradation of the light source, in addition to the control circuit shown in FIG. 5. The like numerals to those shown in FIG. 5 denote the elements of like functions and they are not explained here.

In FIG. 8, OP1–OP3 denote operational amplifiers, R8–R16, RT and RC denote fixed resistors, C7–C10 and CT denote capacitors, Q1–Q3 denote IC's, VR1 and VR2 denote potentiometers, Vcc denotes a positive voltage source, LED denotes a light emitting diode, D denotes a diode and OUT2 denotes an output terminal to be connected to the H.F. fluorescent lamp stabilizer 5.

Figure 9:
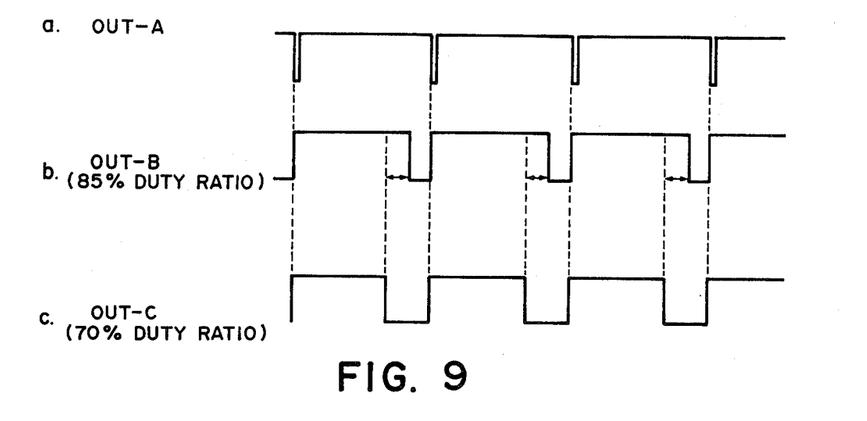

The IC Q1, the fixed resistors R15 and R16 and the capacitors C8 and C9 form an oscillation circuit which produces an oscillation output OUT-A as shown in FIG. 9a. The oscillation output OUT-A is supplied to trigger terminals 2 of the IC Q2 and the IC Q3.

As in the circuit of FIG. 5, the light quantity is controlled to maintain the light quantity set by the light quantity setter 53.

Like the IC Q2, the IC Q3 operates as a monostable multivibrator, and the duty ratio of the output clock signal OUT-C thereof is determined by the resistor RT and the capacitor CT. The rise timings of the clock signals OUT-B and OUT-C of the IC Q2 and IC Q3 are synchronized with the oscillation output OUT-A of the oscillation circuit formed by the IC Q1 (See FIG. 9).

The duty ratio of the clock signal OUT-C of the IC Q3 is set, for example, to 70%. (This is an upper limit of the energization current of the light source). As a result, when the duty ratio of the clock signal OUT-B of the IC Q2, that is, the clock signal OUT-B applied to the H.F. fluorescent lamp stabilizer 55, exceeds 70% (as described above, the H.F. fluorescent lamp stabilizer 55 energizes the light source 51 in accordance with the duty ratio of the clock signal OUT-B), the current of the clock signal OUT-B flows to the IC Q3 through the light emitting diode LED, the diode D and the fixed resistor RC. As shown in FIG. 9, when the duty ratio of the clock signal OUT-B from the IC Q2 is larger than that of the clock signal OUT-C which is preset to 70%, a current corresponding to a difference between the duty ratios flows through the light emitting diode LED so that the light emitting diode LED emits light to indicate to an operator that the duty ratio of the clock signal OUT-B from the IC Q2 is too large. If the duty ratio of the clock signal OUT-B from the IC Q2 is smaller than the preset 70% duty ratio of the clock signal OUT-C from the IC Q3, the current corresponding to the difference between the duty ratios of the clock signals OUT-B and OUT-C is prevented from flowing through the light emitting diode LED because the diode D is connected in series with the light emitting diode LED. Accordingly, the light emitting diode LED does not emit light. In this manner, as the light source 51 degrades and the light quantity therefrom decreases, the output voltage Vf of the sensor 52 reduces and hence the output voltage $V_{IN}$ of the operational amplifier OP3 increases. Consequently, the duty ratio of the clock signal OUT-B from the IC Q2 increases to exceed the preset duty ratio of the clock signal OUT-C from the IC Q3. When this happens, the light emitting diode LED emits light so that the operator can indentify the degradation of the light source 51.

In this manner, an error operation which is apt to take place as the light source degrades in the automatic light quantity control circuit can be detected.

An input device for inputting information relating to the formation of an image in an image forming apparatus, such as instructions for the number of copies, start of operation and stop of operation, is now explained.

Figure 10:
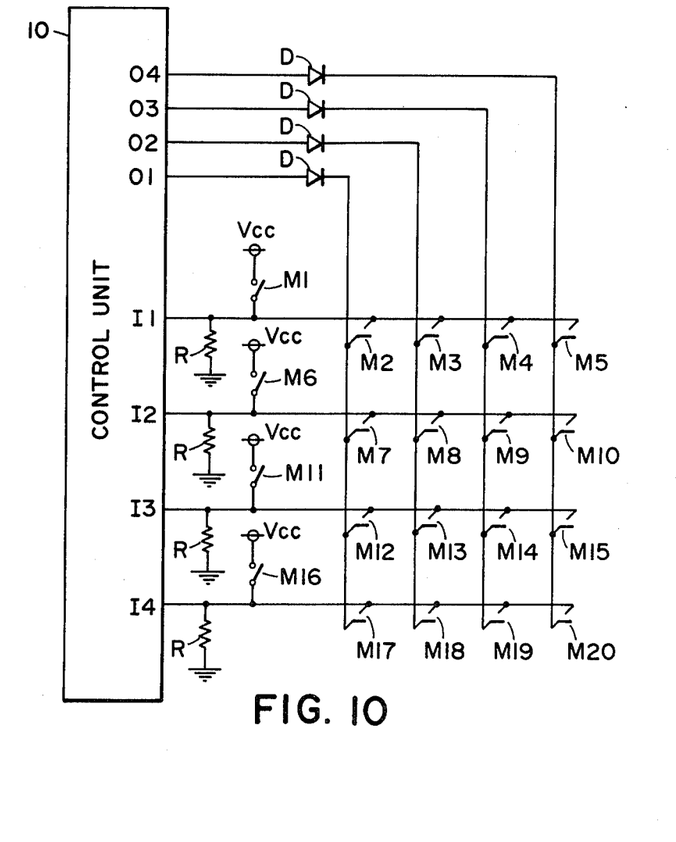
FIG. 10 shows a control circuit which uses an input device of the present invention.

FIG. 10 shows an embodiment of a control circuit which utilizes the input device of the present invention. Numeral 10 denotes a control unit having a counter function and a microcomputer having a ROM and a RAM, O1–O4 denote output ports, I1–I4 denote input ports, R denotes a resistor, D denotes a diode, Vcc denotes a power supply and M1–M20 denote switches. As shown in FIG. 10, a key matrix circuit is formed by the output ports O1–O4 and the input ports I1–I4 of the control unit 10, and the power supply is connected to the input ports I1–I4 through the switches M1, M6, M11 and M16. When the switch M1 is actuated, the power supply is connected to the input port I1 through the switch M1 so that a potential thereof is applied to the input port I1 as a HIGH signal. Similarly, when the switches M6, M11 and M16 are actuated, the HIGH signals are applied to the input ports I2, I3 and I4, respectively. In this manner, by actuating the switches M1, M6, M11 and M16, the signals similar to the HIGH signal generated by the actuation of the switches in the key matrix circuit are applied to the input ports I1–I4.

Figure 11:
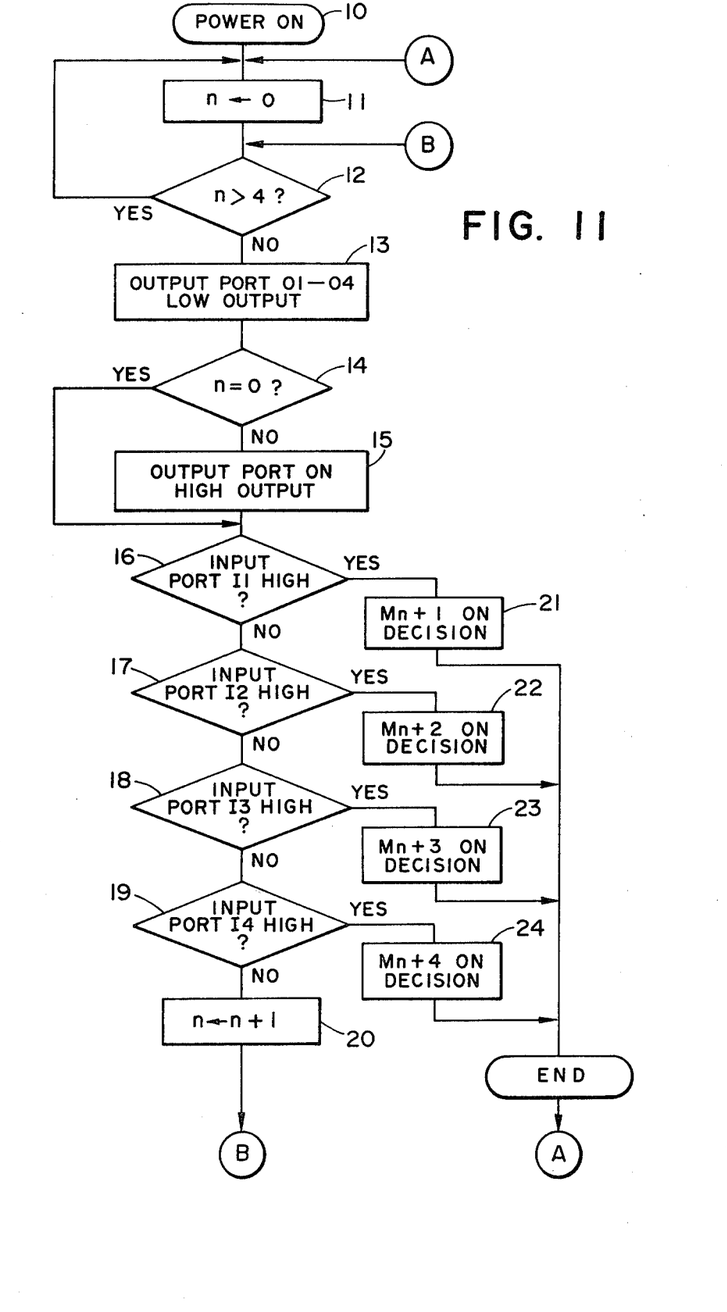
FIG. 11 shows a control flow chart in accordance with the present invention.

FIG. 11 shows a control flow chart of the control unit 10 of the input device of the present invention. Control information is stored in the ROM of the control unit 10.

The operation will now be explained in detail with reference to FIGS. 10 and 11.

In a step 10, the control unit is powered and the control unit (CPU) 10 starts the operation. In a step 11, a counter of the control unit 10 is reset to zero and the process proceeds to a step 12. In the step 12, if the content n of the counter of the control unit 10 is no larger than 4, the process proceeds to a step 13, and if it is larger than 4, the process goes back to the step 11. Since the content n of the counter is 0 in this particular example, the process proceeds to the step 13. In the step 13, the output signals at the output ports O1-O4 of the control unit 10 are rendered to LOW level and the process proceeds to a step 14.

In a step 14, if the content n of the counter of the control unit 10 is 0, the process proceeds to a step 16, and if it is not 0, the process proceeds to a step 15. Since the content n is 0 in this example, the process proceeds to the step 16. In the step 16, if the HIGH signal is applied to the input port I1, the process proceeds to a step 21 where it is determined that the switch M1 is on and the key status is read into the RAM. If the HIGH signal is not being applied to the input port I1, the process proceeds to a step 17. In the step 17, if the HIGH signal is being applied to the input port I2, the process proceeds to a step 22 where it is determined that the switch M6 is on and it is read into the RAM. If the HIGH signal is not applied to the input port I2, the process proceeds to a step 18. In the step 18, if the HIGH signal is being applied to the input port I3, the process proceeds to a step 23 where it is determined that the switch M11 is on and it is read into the RAM. If the HIGH signal is not being applied to the input port I3, the process proceeds to a step 19. In the step 19, if the HIGH signal is applied to the input port I4, the process proceeds to a step 24 where it is determined that the switch M16 is ON and it is read into the RAM. If the HIGH signal is not applied to the input port I4, the process proceeds to a step 20. In the step 20, the content n of the counter is incremented by one. Since the content n of the counter is 0 in this example, the content n of the counter is set to 1 and the process goes back to B . If the on-state of either one of the switches M1, M6, M11 and M16 is detected in the step 21, 22, 23, or 24, the key status is read into the RAM to complete the first key scan and the process goes back to A . When the count n of the counter is 0, the HIGH signal is not produced from any of the output ports O1-O4, and the HIGH signals at the input ports I1-I4, due to the on/off states of the switches M1, M6, M11 and M16, are determined. If the on-state of any of the switches M1, M6, M11 and M16 is detected, the key status is read into the RAM and the process goes back to the step 11 to determine the on/off state of the switches M1, M6, M11 and M16 with the content n of the counter being 0. If the on-state is not detected for the switches M1, M6, M11 and M16 when the content n of the counter is 0, the content n of the count is set to 1 and the process proceeds to the step 12. In the step 12, since the content n of the counter is 1 in this example and is smaller than 4, the process proceeds to the step 13. In the step 13, all outputs at the output ports O1-O4 are rendered to LOW level and the process proceeds to the step 14. In the step 14, since the count n of the counter is 1, the process proceeds to the step 15. In the step 15, the output at the output port O1 is rendered to HIGH level and the process proceeds to the step 16. In the subsequent steps, the input signal status of the input ports I1-I4 are sequentially examined and the on/off states of the switches M2, M7, M12 and M17 are determined in the same manner as is done in the case that the content n of the counter is 0. If the on-state of the switch M2, M7, M12 or M17 is detected, the process goes back to A and the content n of the counter is set to 0 to determine the on/off states of the switches M1, M6, M11 and M16 with the content n of the counter being 0. If the ON state of the switch M2, M7, M12 or M17 is not detected, the content n of the counter is set to 2 and the process goes back to B . When the content n of the counter is 1, only the output port O1 produces the HIGH signal and the on/off states of the switches M2, M7, M12 and M17 are determined. Similarly, when the content n of the counter is 2, the on/off states of the switches M3, M8, M13 and M18 are determined, when the content n of the counter is 3, the on/off states of the switches M4, M9, M14 and M19 are determined, and when the content n of the counter is 4, the on/off states of the switches M5, M10, M15 and M20 are determined. When the content n of the counter is 5, the process goes back from the step 12 to the step 11 where the content n of the counter is again set to 0 to continue the detection of the on/off states of the switches.

In the input device which utilizes the prior art key matrix circuit, only $(m \times n)$ control information can be entered to the control unit, where m is the number of the output ports and n is the number of the input ports. In accordance with the present invention in which the power supply is connected to the input ports through the switches, $\{(m+1) \times n\}$ control information can be entered and there is no need for addition of a multiplexor circuit. Accordingly, the limited number of input/output ports of the control unit can be utilized economically and effectively.

While four output ports and four input ports have been shown in the illustrated embodiment, it should be understood that the same effect is attained when different numbers of ports are used. It is not necessary to connect the power supply to all of the input ports through the switches, and the number of switches for entering the control information may be increased or decreased as required.

Figure 12:
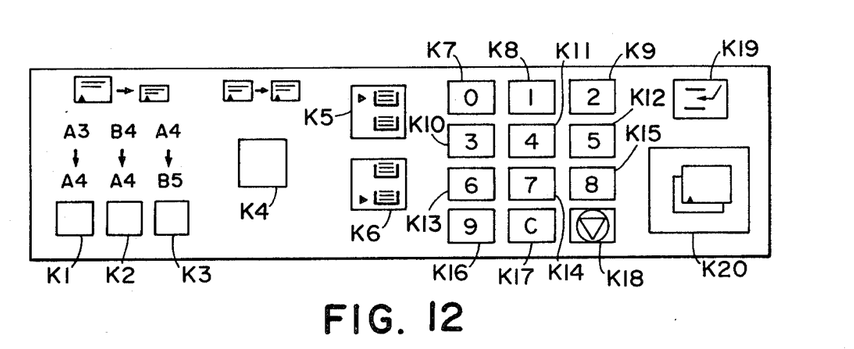
FIG. 12 shows an external view of a copying machine in which the input device of the present invention is embodied.

FIG. 12 shows an external view of an input panel when the input device of the present invention is embodied in a copying machine. K1, K2 and K3 denote reduced copy setting keys, K4 denotes an equal scale copy instruction/reduced copy release key, K5 and K6 denote upper and lower tray selection buttons, K7-K16 denote numeric keys for setting the number of copies, K17 denotes a clear key for clearing the number set by the numeric keys K7-K16, K18 denotes a stop key for interrupting the copying operation, K19 denotes an interruption copy key and K20 denotes a copy start key. Copying machines have many functions and the number of functions will increase in future. Accordingly, the quantity of control information to the control unit which controls the machine will increase. Consequently, a number of input/output ports are required in the control unit. In accordance with the present invention, the switching means or the keys can be added without adding the input/output ports, merely by connecting the power supply to the input ports through the switching means and altering the control information of the control unit 10.

While the power supply is connected to the additional switching means in the illustrated embodiment, the power supply may be replaced by signals other than those from the key matrix produced by the control unit, such as a latch signal for controlling the drive of a motor of the image forming apparatus. When the motor drive control signal is used, it is possible to inhibit the entry by the switch because the read-in of the status of the additional switches is in synchronism with the drive of the motor.

Figure 13:
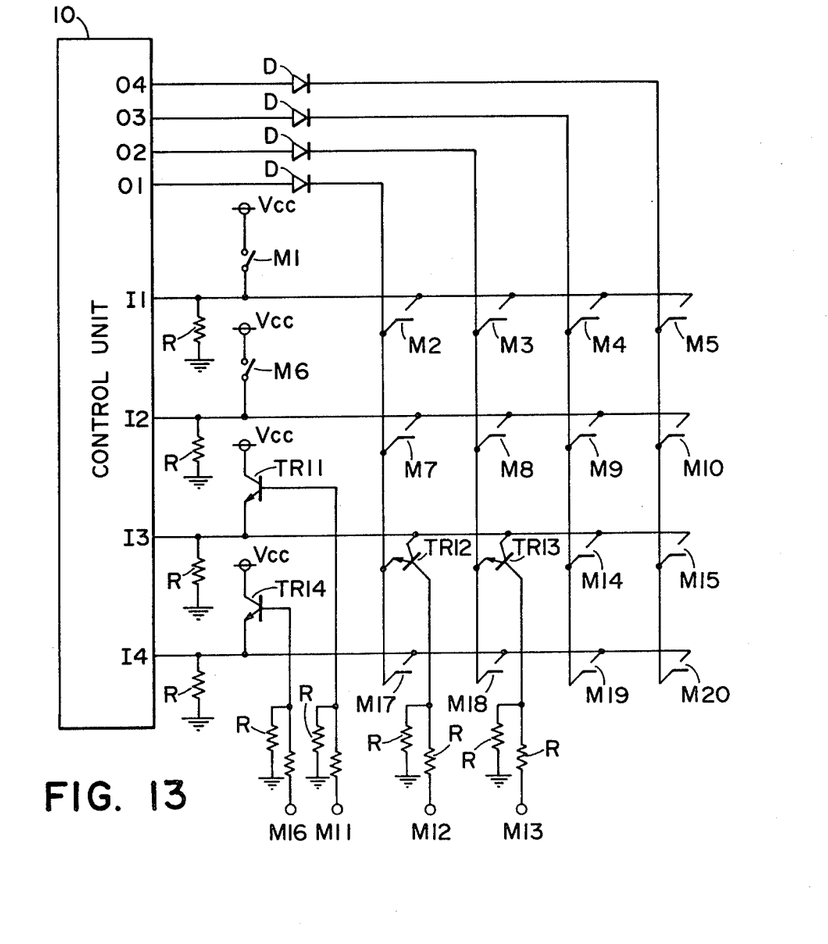
FIG. 13 shows a control circuit of another embodiment of the present invention.

The switches M1-M20 shown in FIG. 10 may be implemented by transistor switching means. FIG. 13 shows an embodiment in which a portion of the switches of FIG. 10 is replaced by the transistors switching means. TR11–TR14 denote transistor. For example, when a voltage is applied to the switch M16, the voltage is applied to a base of the transistor TR4 so that the transistor TR4 turns on. As a result, the same effect as when the switch M16 of FIG. 10 is on is attained.

A light quantity controller for setting a light quantity of an illumination lamp is now explained.

Figure 14:
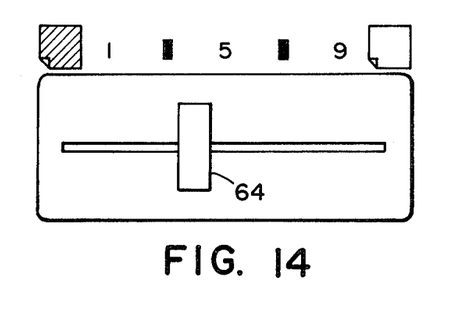
FIG. 14 shows a external view of an copy density setter.

In a copying machine, an operator controls the light quantity of the light source for exposing the image by manipulating copy density setting means of the machine such as a knob 64 of copy density setter as shown in FIG. 14 so that the light quantity of the light reflected from the text and impinging to the photo-sensitive element is changed to set a desired density of the image reproduced on the transfer medium.

Figure 16:
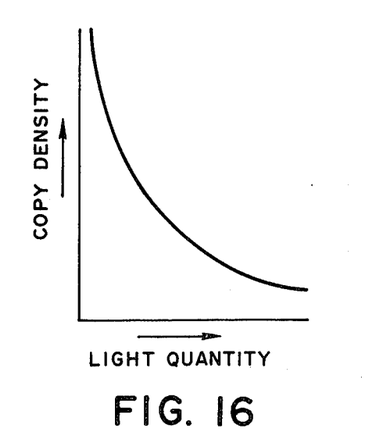
FIG. 16 shows a graph illustrating a relation between a light quantity of a CdS photo-sensitive element and a copy tone.

FIG. 15 shows a block diagram of a circuit for controlling the light quantity of the light source by the copy density setter. Numeral 61 denotes a light source, numeral 62 denotes a control circuit, numeral 63 denotes a density setter and numeral 70 denotes a light source. In such a circuit, when the light quantity of the light source 61 linearly changes relative to a control voltage Vc produced from the density setter 63, that is, when the control circuit 62 controls the amount of energization from the power supply 70 to the light source 61 linearly relative to the control voltage Vc applied to the control circuit 62 and the light quantity changes linearly relative to the amount of energization, and when the light from the light source 61 is directed to the CdS photo-sensitive element to produce a latent image and a copy is made in accordance with the latent image, a relation between the light quantity of the light source 61 and the copy density is not linear but logarithmic as shown in FIG. 16 because of a characteristic of the CdS photo-sensitive element to the light. In other words, the relation between the control voltage Vc and the copy density is not linear. Accordingly, if the control voltage Vc of the density setter 63 is linear relative to the change of the knob 64, a relation between the amount of movement of the knob 64 of the tone setter 63 and the change of the copy density is not linear. This means that the operator finds a difference between a density setting of the copy density setter 63 having equi-spaced indices as shown in FIG. 14 and an actual copy density and finds it inconvenient.

The inconvenience due to the characteristic of the photo-sensitive element is also encountered in the photo-sentitive elements other than in the CdS photo-sensitive element.

Figure 17:
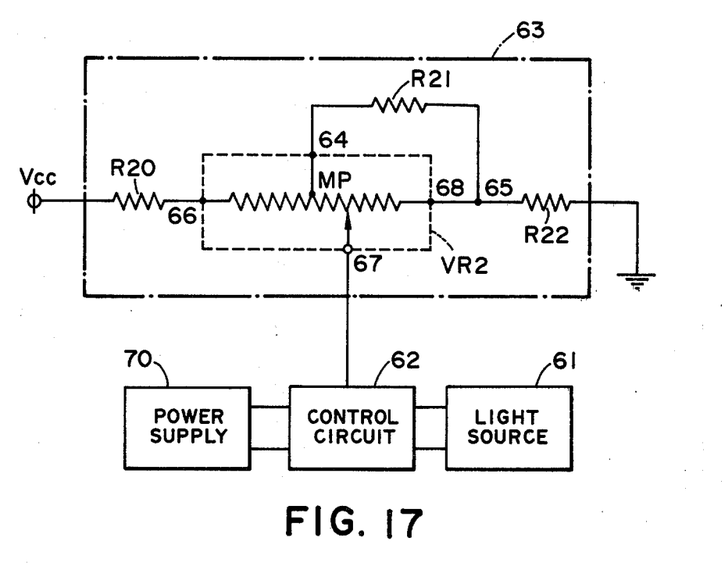
FIG. 17 shows a circuit diagram of a light quantity controller in accordance with the present invention.

FIG. 17 shows an embodiment of the light quantity controller in accordance with the present invention. Numeral 61 denotes a light source, numeral 62 denotes a control circuit for linearly changing the light quantity of the light source 61 by a control voltage Vc, VR2 denotes a potentiometer having a linear characteristic, R20, R21 and R22 denotes fixed resistors, Vcc denotes a positive voltage source, numerals 64, 65, 66 and 68 denote terminals, numeral 67 denotes a movable output terminal, numeral 70 denotes a power supply, and MP denotes a center point of the potentiometer VR2. A copy density desired by the operator is set by changing the control voltage Vc to the control circuit 62 by moving the output terminal 67 which is coupled to and movable with the knob 64 so that the control circuit 62 controls the amount of energization from the power supply 70 to the light source 61. As shown in FIG. 17, the terminal 64 at the center point MP of the potentiometer VR2 and the terminal 65 between the potentiometer VR2 and the fixed resistor R22 are connected in parallel with a portion of the potentiometer VR2 through the resistor R21. The fixed resistors R20 and R22 define a voltage across the terminals 66 and 65.

Assuming that a resistance between the terminals 66 and 68 of the potentiometer VR2 is 2r and a resistance of the resistor r21 is $r_{21}$, a ratio of a changing rate $\Delta V66$ when the output terminal 67 for the control voltage Vc, which is produced in accordance with the movement of the terminal 67 in the density setter 63, is moved between the center point MP and the terminal 66 to a changing rate $\Delta V68$ when the output terminal 67 is moved between the center point MP and the terminal 68 is given by;

$$\Delta V66/\Delta V68 = r/\frac{r_{21}}{r + r_{21}}$$

Figure 18:
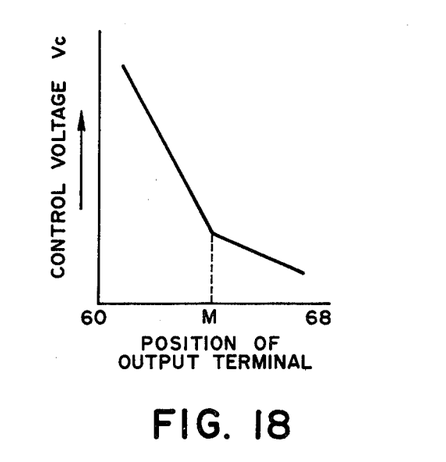
FIG. 18 shows a graph illustrating a relation between a position of an output terminal and a control voltage.

Consequently the relation between the position of the output terminal 67 and the control voltage Vc is represented by a two-segment line as shown in FIG. 18 in which the changing rate changes at the center point MP in the range of movement of the output terminal 67. Thus, by using the realtion in changing the control voltage Vc in accordance with the movement of the knob 64 in the density setter 63, the relation between the position of the knob 64 and the control voltage Vc can be approximated to a logarithmic function. Accordingly, when this control voltage Vc is applied to the control circuit 62, the relation between the light quantity, which is determined by the amount of energization to the light source 61 which in turn is controlled by the control circuit 62, and the position of the knob 64 is similar to the relation between the position of the knob 64 and the control voltage Vc. Thus, by forming the latent image by the light quantity thus controlled and selecting a relation between the copy density resulting from the latent image and the position of the knob 64 by appropriately setting the fixed resistors R20, R21 and R22 and the potentiometer VR2 of FIG. 17, an essentially linear relation is attained.

As described above, in accordance with the present invention, an essentially linear relation is attained between the setting position of the knob of the density setter and the copy density determined by the knob without requiring a potentiometer having a special resistance characteristic or a logarithmic amplifier.

The illustrated embodiment attempts to attain the essentially linear relation between the copy density and the change of the knob 64 over the entire range of the movement of the knob 64 of the density setter. Alternatively, the range of the movement of the knob 64 which assures the linear relation may be restricted to a vicinity of index 5 which is most frequently used, shown in FIG. 23.

As described above, in accordance with the present invention, a copy machine having a light quantity controller which is inexpensive and readily set by an operator is provided. The light quantity controller of the present invention can also be used in an exposure device of an illumination apparatus or a photographing apparatus in which control of light quantity is desired.

What we claim is:

1. A light quantity controller comprising:
    a light source adapted to emit light upon energization;

means for detecting the light quantity of said light source, and for producing a detection signal;

setting means for manually setting a desired light quantity of said light source, and for generating a reference signal in accordance with the light quantity set;

means for comparing the detection signal and the reference signal from said setting means, and for producing a comparison result as an output;

means for controlling an amount of an energization signal applied to said light source in accordance with the reference signal from said setting means; and means for adding the output signal from said comparing means to the reference signal to be applied to said control means so that the light quantity detected by said detecting means becomes equal to the desired light quantity set by said setting means.

2. A light quantity controller according to claim 1 wherein said control means controls a duty ratio of the energization to said light source.

3. A light amount controller according to claim 1 further comprising means for indicating the degradation of said light source.

4. A light quantity controller according to claim 1 further comprising a high frequency power source for supplying power to said light source wherein said control means controls a conductive period of said power source.

5. A light quantity controller according to claim 4, wherein said light source comprises a flourescent lamp driven by said high frequency power source.

6. A light quantity controller according to claim 1, wherein said setting means has a manually movable member for setting a desired light quantity.

7. A light quantity controller comprising;
a light source adapted to emit light upon energization,
control means for generating a periodic signal to control the energization to said light source, and
means for determining a status of said signal to detect the degradation of said light source.

8. A light quantity controller according to claim 7 wherein said detection means includes means for generating a reference signal and comparing said control signal with said reference signal to detect the degradation.

9. A light quantity controller according to claim 7 wherein said detection means includes indication means for indicating the degradation of said light source.

10. A light quantity controller according to claim 7 wherein said control means controls a duty ratio of said periodic signal.

11. A light amount controller comprising;
a light source adapted to emit light upon energization,
means for detecting light quantity of said light source,
means for setting a light quantity to be maintained by said light source,
control means responsive to said detection means and said setting means for generating a first signal having a duty ratio to control the energization to said light source,
means for generating a second signal having a predetermined duty ratio, and
means for comparing to duty ratios of said first signal and said second signal to determine the degradation of said light source.

12. A light amount controller according to claim 11 further comprising a high frequency power source for supplying power to said light source, said power being controlled in accordance with the duty ratio of the first signal generated from said control means.

13. A light amount controller according to claim 11 wherein said comparing means determines a degradation of said light source, if the duty ratio of the first signal is larger than that of the second signal.

14. A light quantity controller comprising:
a light source adapted to emit light upon energization;
means for detecting a light quantity of said light source;
means responsive to an output from said detecting means for producing a driving signal to turn on said light source to a desired light quantity;
means for controlling a power supply to said light source based on the driving signal from said driving signal producing means; and
means for determining an improper status of said light source based on the output signal from said detecting means.

15. A light quantity controller according to claim 14 wherein said determining means has means for indicating the determination result.

16. A light quantity controller according to claim 14 further comprising means for manually setting the desired light quantity of said light source.

17. A light quantity controller according to claim 14 wherein said control means controls a period of the power supply to said light source in accordance with the driving signal.

18. A light quantity controller according to claim 14 wherein said light source is driven by a high frequency voltage.

* * * * *

UNITED STATES PATENT AND TRADEMARK OFFICE
CERTIFICATE OF CORRECTION

PATENT NO. : 4,467,246
DATED : August 21, 1984
INVENTOR(S) : KANO TANAKA, ET AL.

It is certified that error appears in the above-identified patent and that said Letters Patent is hereby corrected as shown below:

COLUMN 2

Line 43, "an" should read --a--.

COLUMN 8

Line 68, "transistors" should read --transistor--.

COLUMN 9

Line 1, "transistor" should read --transistors--.
Line 14, "to" should read --on--.
Lines 21 and 22, "light source" should --power supply--.

COLUMN 10

Line 26, "realtion" should read --relation--.
Line 57, "23" should read --14--.

Signed and Sealed this

Fifth Day of November 1985

[SEAL]

Attest:

DONALD J. QUIGG

Attesting Officer

Commissioner of Patents and Trademarks